(12) United States Patent
Funasaka (10) Patent No.: US 7,659,889 B2
(45) Date of Patent: Feb. 9, 2010

(54) TOUCH PANEL DEVICE

(75) Inventor: Tsukasa Funasaka, Suwa (JP)

(73) Assignee: Seiko Epson Corporation (JP)

( * ) Notice: Subject to any disclaimer, the term of this patent is extended or adjusted under 35 U.S.C. 154(b) by 770 days.

(21) Appl. No.: 11/300,105

(22) Filed: Dec. 14, 2005

(65) Prior Publication Data

US 2006/0139341 A1    Jun. 29, 2006

(30) Foreign Application Priority Data

Dec. 28, 2004   (JP) ............................. 2004-380850

(51) Int. Cl.
*G06F 3/043* (2006.01)

(52) U.S. Cl. ...................... 345/177; 345/175

(58) Field of Classification Search .................. 345/177
See application file for complete search history.

(56) References Cited

U.S. PATENT DOCUMENTS

| 4,700,176 | A |   | 10/1987 | Adler |        |
|-----------|---|---|---------|-------|--------|
| 5,854,450 | A | * | 12/1998 | Kent  | 178/18.04 |
| 6,567,077 | B2| * | 5/2003  | Inoue et al. | 345/173 |

2003/0164820 A1    9/2003 Kent

FOREIGN PATENT DOCUMENTS

| EP | 1 107 102    | 6/2001 |
| JP | 61-112444    | 7/1986 |
| JP | 06-149458    | 5/1994 |
| JP | 2002-041232  | 2/2002 |
| WO | WO 01/57636  | 8/2001 |

* cited by examiner

*Primary Examiner*—Sumati Lefkowitz
*Assistant Examiner*—Ke Xiao
(74) *Attorney, Agent, or Firm*—Harness, Dickey & Pierce, P.L.C.

(57) ABSTRACT

A touch panel device including: a substrate; a first sender element for sending surface acoustic wave, which is placed along a first direction on the substrate; a second sender element for sending surface acoustic wave, which is placed along a second direction, orthogonal to the first direction, on the substrate; a receiver element for receiving the surface acoustic wave from the second sender element, which is placed along the second direction on the substrate while facing the second sender element with an interval in between; and a reflector, which is placed on the substrate, for achieving the receiver element's reception of the surface acoustic wave from the first sender element by reflecting the surface acoustic wave from the first sender element, wherein a position of a contact body touching on a contact surface is detected by transmitting the surface acoustic wave that is sent from the sender element through the contact surface and receiving the surface acoustic wave on the receiver element.

5 Claims, 8 Drawing Sheets

FIG. 1

A-A CROSS SECTION

WITHOUT CONTACT

FIG. 8B

WITH CONTACT

TOUCH PANEL DEVICE

BACKGROUND

1. Technical Field

The present invention relates to a touch panel device that detects the position of a contact body on the coordinate system of a contact surface by transmitting surface acoustic wave sent from a sender element and receiving the surface acoustic wave on a receiver element.

2. Related Art

A touch panel device has a configuration wherein the position of a contact body is detected with a touch of the contact body to a contact surface. As such a touch panel device, a configuration wherein surface acoustic wave is transmitted from an interdigital transducer on the sender side and received on another interdigital transducer on the receiver side.

JP-UM-A-61-112444 (FIG. 4) is an example of related art.

A coordinate detector according to the example JP-UM-A-61-112444, which is used as a touch panel device, has two sender interdigital transducers for excitation purposes and two pairs of interdigital transducers for reception purposes.

The surface acoustic wave sent from one exciter interdigital transducer is received by one pair of receiver interdigital transducers on the opposite side. The surface acoustic wave sent from the other exciter interdigital transducer is received by the other pair of receiver interdigital transducers on the opposite side.

Since the above configuration requires two pairs of receiver interdigital transducers and each pair further includes a plurality of interdigital transducer elements, the wiring of the electric couplings becomes very complicated. In the case of reading the coordinates of a 20×20 matrix, for example, forty pieces of coupling wire are required for two pairs of receiver interdigital transducers alone, which causes a problem with wiring on the substrate periphery.

SUMMARY

An advantage of the invention is to provide a touch panel device that requires a less number of receiver elements and therefore achieves the simplification of the configuration.

According to a first aspect of the invention, a touch panel device includes: a substrate; a first sender element for sending surface acoustic wave, which is placed along a first direction on the substrate; a second sender element for sending surface acoustic wave, which is placed along a second direction, orthogonal to the first direction, on the substrate; a receiver element for receiving the surface acoustic wave from the second sender element, which is placed along the second direction on the substrate while facing the second sender element with an interval in between; and a reflector, which is placed on the substrate, for achieving the receiver element's reception of the surface acoustic wave from the first sender element by reflecting the surface acoustic wave from the first sender element, wherein a position of a contact body touching on a contact surface is detected by transmitting the surface acoustic wave that is sent from the sender element through the contact surface and receiving the surface acoustic wave on the receiver element.

In the configuration according to the first aspect of the invention, the first sender element is placed along the first direction on the substrate and sends surface acoustic wave. The second sender element is placed along the second direction, orthogonal to the first direction, on the substrate and sends surface acoustic wave.

The receiver element is placed along the second direction on the substrate while facing the second sender element with an interval in between. The receiver element receives the surface acoustic wave from the second sender element.

The reflector, which is placed on the substrate, achieves the receiver element's reception of the surface acoustic wave from the first sender element by reflecting the surface acoustic wave from the first sender element.

Therefore, only a single pair of receiver elements are required and the surface acoustic wave from the second sender element can be received directly by the receiver element. Further, the reflector achieves the receiver element's reception of the surface acoustic wave from the first sender element by reflecting the surface acoustic wave from the first sender element. Thus, the electric wiring can be simplified while reducing the number of receiver elements and, with the reduction in the number of receiver elements on a substrate, the configuration of a touch panel can be simplified, leading to cost reduction.

According to a second aspect of the invention, in the touch panel device according to the first aspect of the invention, a plurality of the reflectors are placed along the first direction on the substrate while facing the first sender element with an interval in between.

In the configuration according to the second aspect of the invention, the plurality of reflectors are placed along the first direction on the substrate while facing the first sender element with an interval in between.

Therefore, the plurality of reflectors can achieve the receiver element's reception of the surface acoustic wave from the first sender element by reflecting the surface acoustic wave from the first sender element.

According to a third aspect of the invention, in the touch panel device according to the first aspect of the invention, a plurality of the receiver elements are placed along the second direction.

In the configuration according to the third aspect of the invention, the plurality of receiver elements are placed along the second direction.

Therefore, the plurality of receiver elements can receive both the surface acoustic wave from the first sender element and the surface acoustic wave from the second sender element.

According to a fourth aspect of the invention, in the touch panel device according to the third aspect of the invention, each of the reflectors has an individual set angle for achieving the corresponding receiver element's reception of the surface acoustic wave from the first sender element.

In the configuration according to the fourth aspect of the invention, each of the reflectors has an individual set angle for achieving the corresponding receiver element's reception of the surface acoustic wave from the first sender element.

Therefore, each reflector can surely achieve each receiver element's reception of the surface acoustic wave from the first sender element by reflecting the surface acoustic wave from the first sender element.

According to a fifth aspect of the invention, in the touch panel device according to the fourth aspect of the invention, each of the reflectors has a plurality of reflecting units and the plurality of reflecting units are placed in parallel at intervals along the second direction.

In the configuration according to the fifth aspect of the invention, each reflector has a plurality of reflecting units. The plurality of reflecting units are placed in parallel at intervals along the second direction.

Therefore, the surface acoustic wave from the first sender element is reflected at a higher reflectance with the plurality of reflecting units included in each reflector, achieving the receiver element's reception of the surface acoustic wave from the first sender element at a higher signal strength.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the accompanying drawings.

Figure 1:
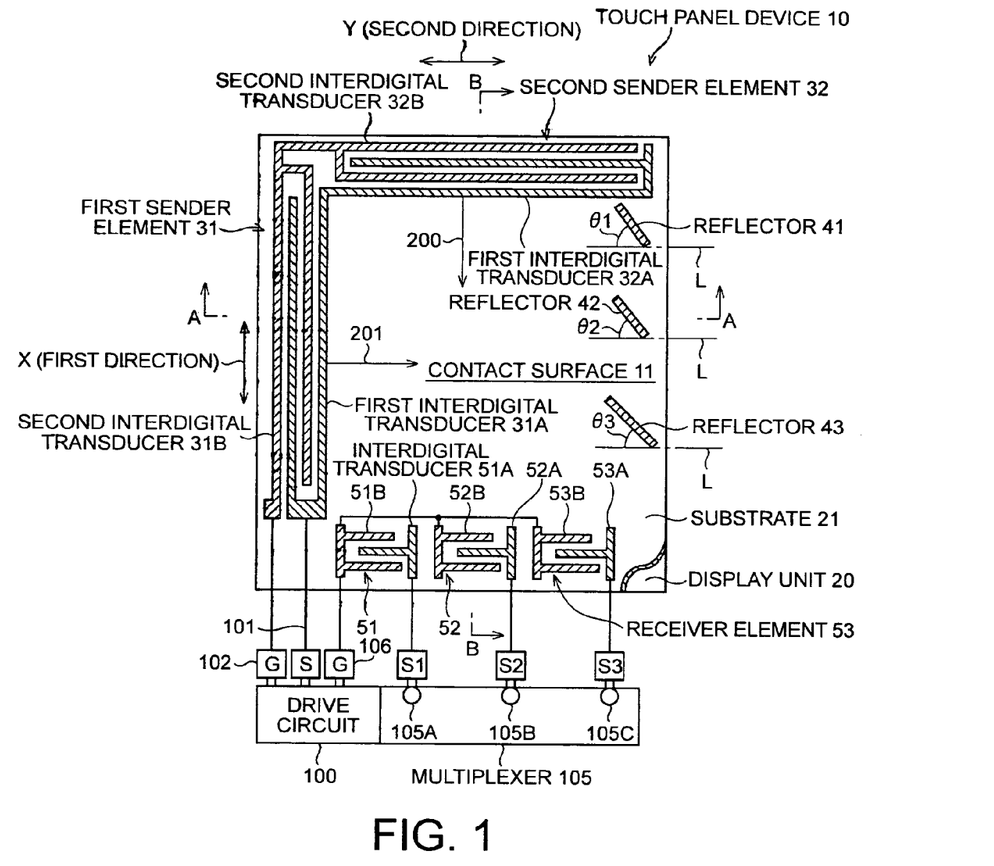
FIG. 1 is a plan view showing a first embodiment of a touch panel device according to the invention.

FIG. 1 is a plan view showing a first embodiment of a touch panel device 10 according to the invention. The touch panel device 10 can also be called an input device, a coordinate input device, or the like.

Figure 2:
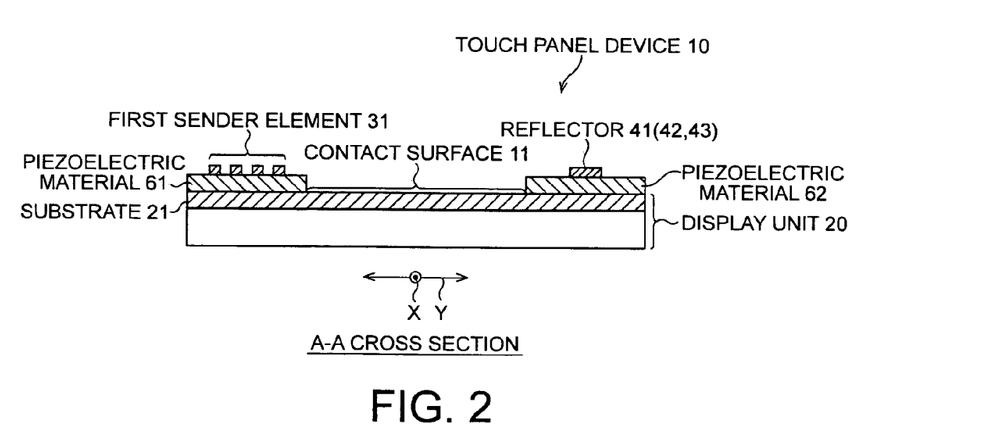
FIG. 2 is a cross section taken along the line A-A of the touch panel device in FIG. 1.
Figure 3:
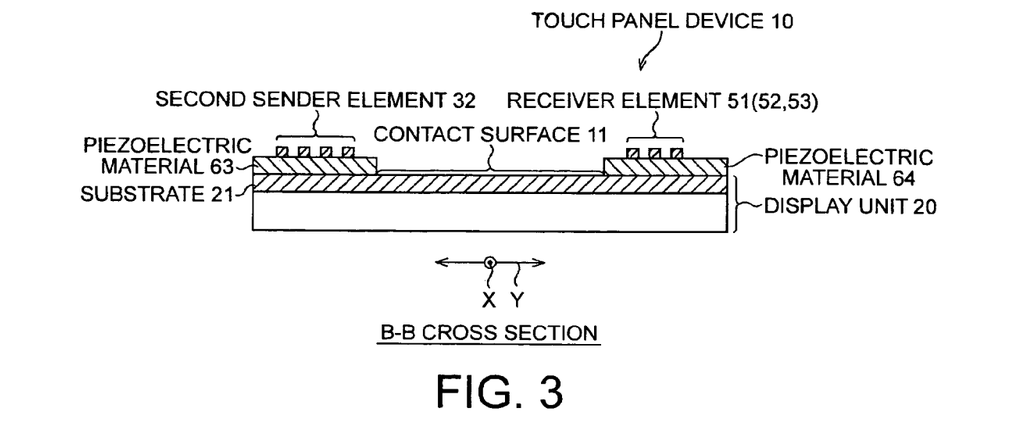
FIG. 3 is a cross section taken along the line B-B of the touch panel device in FIG. 1.

FIG. 2 is an example of the cross-sectional configuration taken along the line A-A of the touch panel device 10 in FIG. 1. FIG. 3 is an example of the cross-sectional configuration taken along the line B-B of the touch panel device 10 in FIG. 1.

As shown in FIGS. 1 to 3, the touch panel device 10 has: a display unit 20; a first sender element 31; a second sender element 32; a plurality of reflectors 41, 42 and 43; and a plurality of receiver elements 51, 52 and 53.

In FIG. 1, the vertical direction is defined as the X-direction and the horizontal direction is defined as the Y-direction. The X-direction is defined as a first direction and the Y-direction is defined as a second direction.

The touch panel device 10 can detect the coordinates or the position of a contact body, such as a finger or a stylus, on a contact surface 11 with a touch of the contact body on the contact surface 11. Therefore, the touch panel device 10 can also be used as a handwriting input device.

The first sender element 31, the second sender element 32, the reflectors 41 to 43, and the receiver elements 51 to 53, which are shown in FIG. 1, are placed on a substrate 21.

As shown in FIG. 2, the first sender element 31 is formed on a piezoelectric material 61. The reflectors 41 to 43 shown in FIG. 2 are formed on another piezoelectric material 62.

As shown in FIG. 3, the second sender element 32 is formed on a piezoelectric material 63. The receiver elements 51 to 53 shown in FIG. 3 are formed on another piezoelectric material 64.

The piezoelectric materials 61 to 64 shown in FIGS. 2 and 3 are placed on the substrate 21.

The display unit 20 has the substrate 21. The display unit 20 is a flat panel display device, which can be a liquid crystal display device, for example. The substrate 21 is a transparent glass substrate, for example. The piezoelectric materials 61 to 64 can be formed of piezoelectric thin film, for example, ZnO, AlN, PZT, etc.

In FIG. 1, the piezoelectric materials 61 to 64 are not illustrated as a matter of simplification.

As shown in FIGS. 2 and 3, the piezoelectric materials 61 to 64 are formed in a rectangular frame shape along the four sides of the substrate 21. The surface of the substrate 21 surrounded by the piezoelectric materials 61 to 64 is the contact surface 11 for contacting a contact body such as a finger or a stylus. The first embodiment shown in FIGS. 1 to 3 has the contact surface 11 of an approximate square or a rectangle.

The first sender element 31 and the second sender element 32 are interdigital transducers (IDTs) for exciting surface acoustic wave.

As shown in FIG. 1, the first sender element 31 has a first interdigital transducer 31A for supplying an excitation signal and a second interdigital transducer 31B for grounding. Likewise, the second sender element 32 has a first interdigital transducer 32A for supplying an excitation signal and a second interdigital transducer 32B for grounding. The first interdigital transducers 31A and 32A are electrically coupled to each other. The second interdigital transducers 31B and 32B are also electrically coupled to each other.

The first interdigital transducer 31A is coupled to a drive circuit 100 so that an excitation signal 101 of the drive circuit 100 is supplied. The grounding interdigital transducer 31B is coupled to a grounding terminal 102 of the drive circuit 100.

The receiver elements 51, 52 and 53 shown in FIG. 1 have the same shape. The receiver elements 51 to 53 have interdigital transducers 51A, 52A and 53A, respectively, for signal reception. The receiver elements 51 to 53 are formed on the substrate 21 along the Y-direction while facing the second sender element 32 with an interval in between. Corresponding to the interdigital transducers 51A, 52A and 53A, grounding interdigital transducers 51B, 52B and 53B are provided in the receiver elements 51, 52 and 53, respectively.

The interdigital transducers 51A, 52A and 53A are electrically coupled to terminals 105A, 105B and 105C, respectively, of a multiplexer 105. The interdigital transducers 51B, 52B and 53B are coupled to a grounding terminal 106 of the drive circuit 100.

Each of the first sender element 31, the second sender element 32, and the receiver elements 51 to 53 can be formed by means of, for example, photolithography, etc. after forming a thin film of conductive metal such as aluminum, etc. by means of evaporation, sputtering, etc.

Next, the reflectors 41 to 43 shown in FIG. 1 will be described.

The reflectors 41 to 43 are placed along the X-direction at intervals. Further, the reflectors 41 to 43 are formed on the substrate 21 while facing the first sender element 31 with an interval in between. The reflectors 41 to 43 can be formed by means of, for example, photolithography, etc. after forming a thin film of conductive metal such as aluminum, etc. by means of evaporation, sputtering, etc.

What is characteristic is that each of the reflectors 41 to 43 has a function for achieving the reception of the surface acoustic wave sent from the first sender element 31 on each of the receiver elements 51 to 53 by reflecting the surface acoustic wave from the first sender element 31.

The reflector 41 is formed at an inclination angle of θ1 with respect to a line L. Likewise, the reflector 42 is formed at an inclination angle of θ2 with respect to the line L. The reflector 43 is formed at an inclination angle of θ3 with respect to the line L. The line L is in parallel with the Y-direction, or the second direction.

It is preferable that the inclination angles θ1 to θ3, which are also called reflection angles, are set within the range from ten to forty-five degrees, for example. In the example shown in FIG. 1, wherein the total of three reflectors 41 to 43 are provided, the inclination angle θ1 is the largest; the inclination angle θ2 is the second largest; and the inclination angle θ3 is the smallest.

In FIG. 1, surface acoustic wave 200 that is generated by the second sender element 32 can be received directly by the corresponding receiver elements 51 to 53.

On the other hand, surface acoustic wave 201 that is generated by the first sender element 31 is first reflected on any of the corresponding reflectors 41 to 43 and then, guided by any of the corresponding receiver elements 51 to 53, received by any of the receiver elements 51 to 53.

Figure 4:
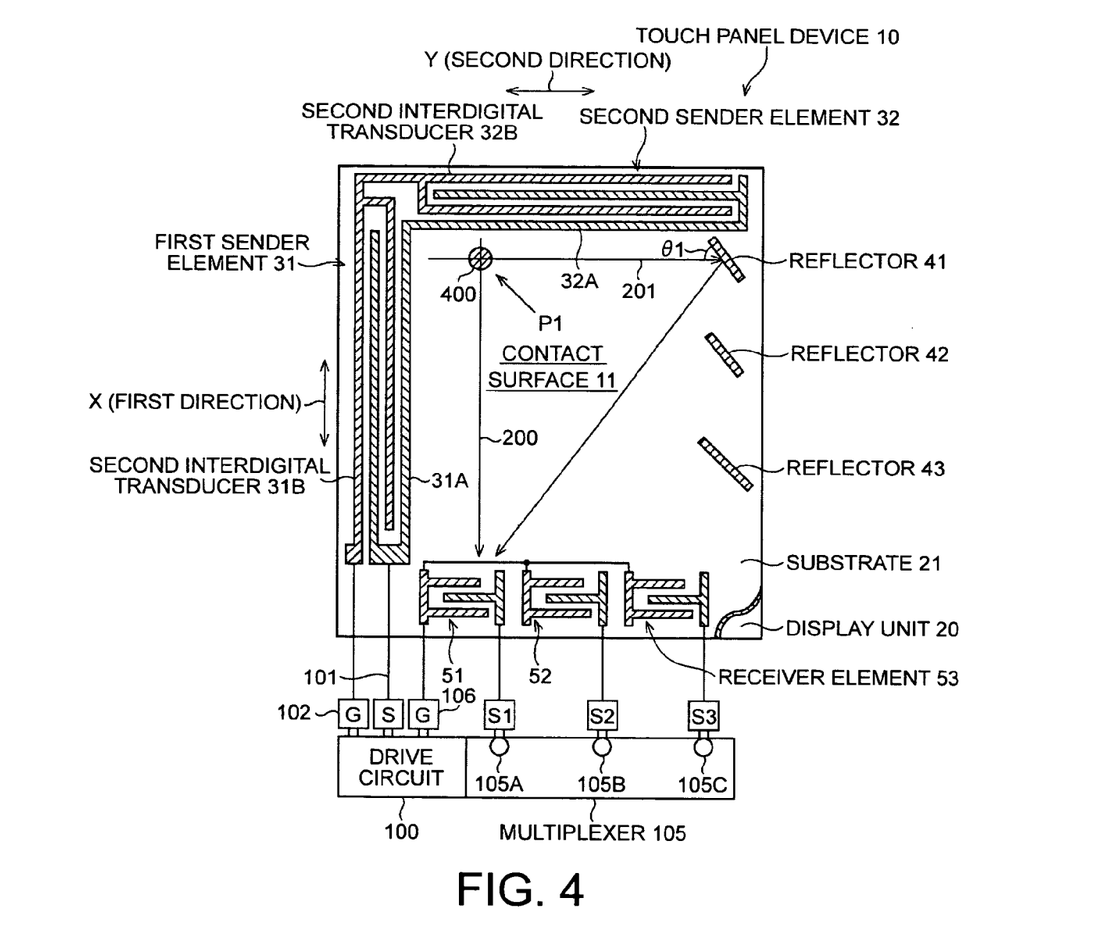
FIG. 4 is a diagram showing a case where a contact body is touching a contact surface at a position P1.
Figure 5:
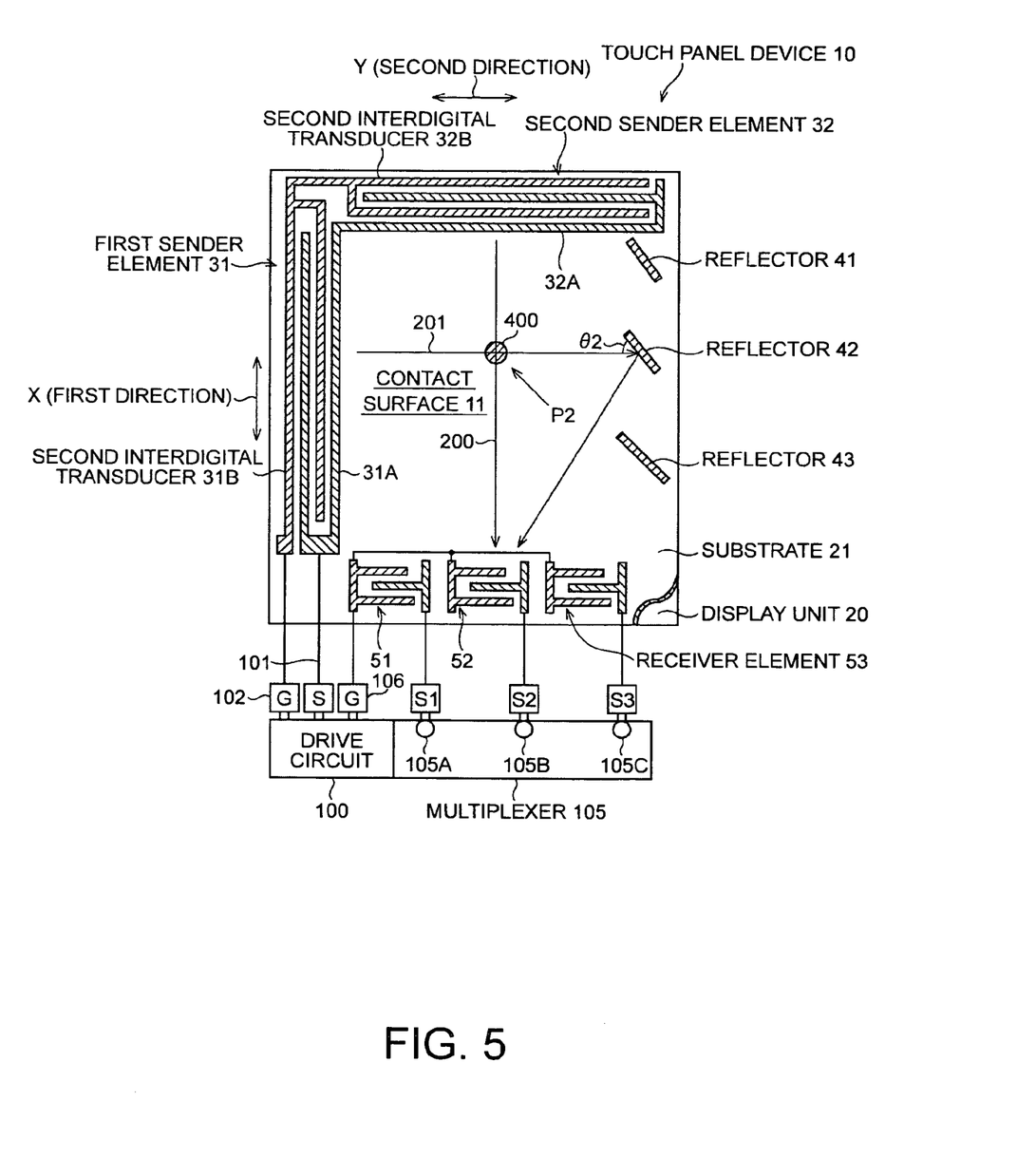
FIG. 5 is a diagram showing a case where a contact body is touching a contact surface at a position P2.
Figure 6:
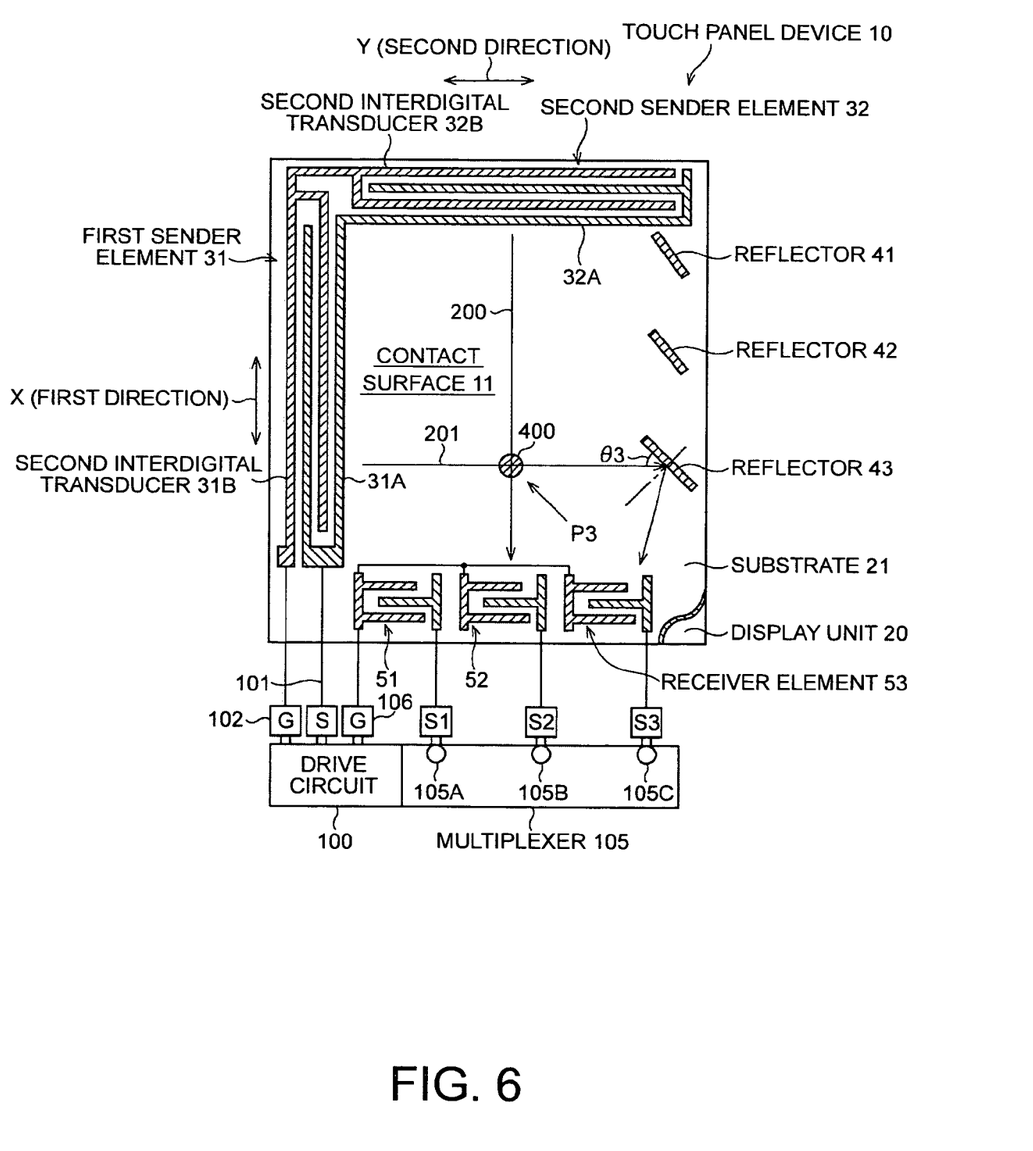
FIG. 6 is a diagram showing a case where a contact body is touching a contact surface at a position P3.

FIGS. 4 to 6 show example cases where a contact body 400 is touching the contact surface 11. In the example shown in FIG. 4, the contact body 400 is touching at a position corresponding to the reflector 41 and the receiver element 51. In the example shown in FIG. 5, the contact body 400 is touching at a position corresponding to the reflector 42 and the receiver element 52. In the example shown in FIG. 6, the contact body 400 is touching at a position corresponding to the reflector 43 and the receiver element 52.

Figure 7:
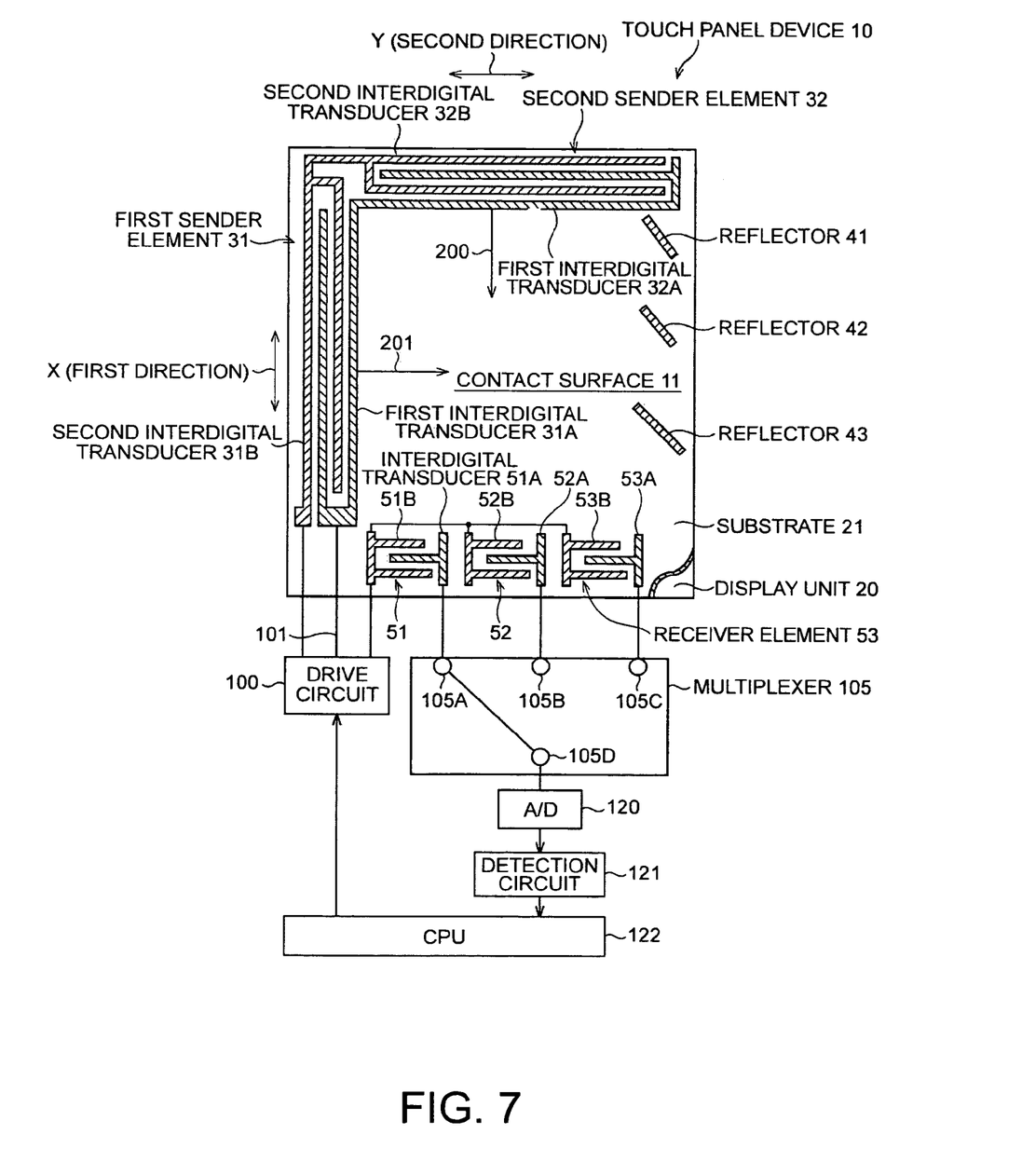
FIG. 7 is a diagram showing a circuit section of the touch panel device according to the first embodiment of the invention.

FIG. 7 shows an example of a circuit section provided in the touch panel device 10. The circuit section of the touch panel device 10 includes the drive circuit 100, the multiplexer 105, an analog-digital converter (A/D converter) 120, a detection circuit 121, and a central processing unit (CPU) 122.

A terminal 105D of the multiplexer 105 is coupled to the detection circuit 121 via the A/D converter 120. The detection circuit 121 is coupled to the CPU 122. The drive circuit 100 supplies the excitation signal 101 to both the first interdigital transducer 31A and the second interdigital transducer 32A, shown in FIG. 1, simultaneously in accordance with a command from the CPU 122.

The terminal 105D of the multiplexer 105 in FIG. 7 is coupled sequentially to the terminals 105A, 105B and 105C. The received signal derived from the interdigital transducers 51A, 51B and 51C is transmitted to the terminals 105A, 105B and 105C. As the terminal 105D of the multiplexer 105 sequentially switches the terminal 105A, 105B and 105C, the signal received on the interdigital transducers 51A, 51B and 51C is converted from analog to digital by the A/D converter 120. The signal converted from analog to digital is transmitted to the CPU 122 after the confirmation of signal detection by the detection circuit 121. Then, the CPU 122 judges on which one of the receiver elements 51, 52 or 53 the signal has been received.

Next, examples of how the CPU 122 detects the position of the contact body 400 on the contact surface 11, as shown in FIGS. 4 to 6, will be described.

In the example shown in FIG. 4, the contact body 400 is touching the position corresponding to the reflector 41 and the receiver element 51. That is, the contact body 400 is touching a position P1 on the contact surface 11.

In any example shown in FIGS. 4 to 6, an excitation signal 201 is supplied from the drive circuit 100 simultaneously to the first interdigital transducer 31A of the first sender element 31 and the first interdigital transducer 32A of the second sender element 32.

Therefore, the first sender element 31 and the second sender element 32 simultaneously excite the surface acoustic wave 201 and the surface acoustic wave 200, respectively. The surface acoustic wave 201 is excited in the Y-direction and transmitted through the contact surface 11. The surface acoustic wave 200 is excited in the X-direction and transmitted through the contact surface 11.

In the example shown in FIG. 4, wherein the contact body 400 is located at the position P1, the surface acoustic wave 201 is transmitted toward the reflector 41, being attenuated at the position P1, and reflected by the reflector 41 to be received by the receiver element 51. At the same time, the surface acoustic wave 200 can be received directly by the receiver element 51 after being attenuated at the position P1.

Since the receiver element 51 can receive both the surface acoustic wave 201 and the surface acoustic wave 200 that are attenuated by the contact body 400, the CPU 122 shown in FIG. 7 can judge that the contact body 400 is located at the position P1.

The other receiver elements 52 and 53 only receive the unattenuated surface acoustic wave 201 using the reflectors 42 and 43, as well as the unattenuated surface acoustic wave 200.

In the example shown in FIG. 5, wherein the contact body 400 is located at the position P2 on the contact surface 11, the surface acoustic wave 201 is attenuated at the position P2; reflected by the reflector 42; and received by the receiver element 52. The surface acoustic wave 200 can be received directly by the receiver element 52 after being attenuated at the position P2.

In the above method, since the receiver element 52 can receive the attenuated surface acoustic wave 201 and the attenuated surface acoustic wave 200, the CPU 122 shown in FIG. 7 can judge that the contact body 400 is located at the position P2.

In the above case, the receiver elements 51 and 53 can receive the unattenuated surface acoustic wave 201 using the reflectors 41 and 43. At the same time, the unattenuated surface acoustic wave 200 can be received directly by the receiver elements 51 and 53.

In the example shown in FIG. 6, the contact body 400 is located at the position P3 on the contact surface 11. Therefore, the attenuated surface acoustic wave 201 can be received by the receiver element 53 after being reflected by the reflector 43. The surface acoustic wave 200 can be received directly by the receiver element 52 after being attenuated at the position P3. Therefore, the receiver element 53 can receive the attenuated surface acoustic wave 201, and the receiver element 52 can receive the attenuated surface acoustic wave 200.

In the above method, the CPU 122 shown in FIG. 7 can judge that the contact body 400 is located at the position P3.

Figure 8A:
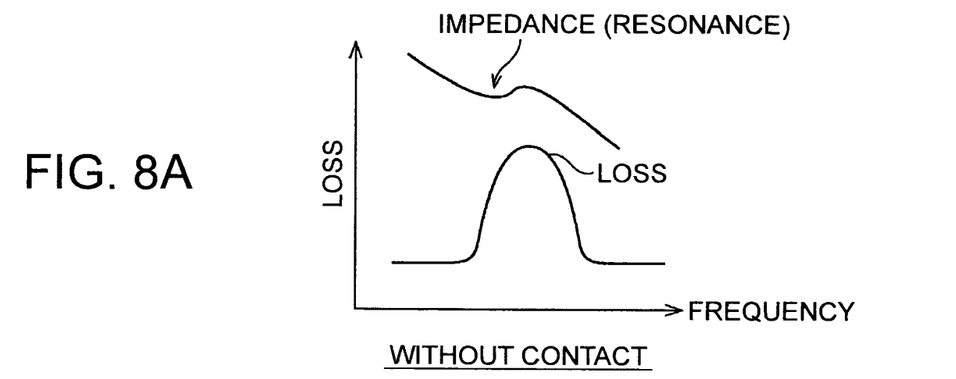
FIGS. 8A, 8B and 8C are diagrams showing examples of loss with or without contact and an example of wave strength.
Figure 8B:
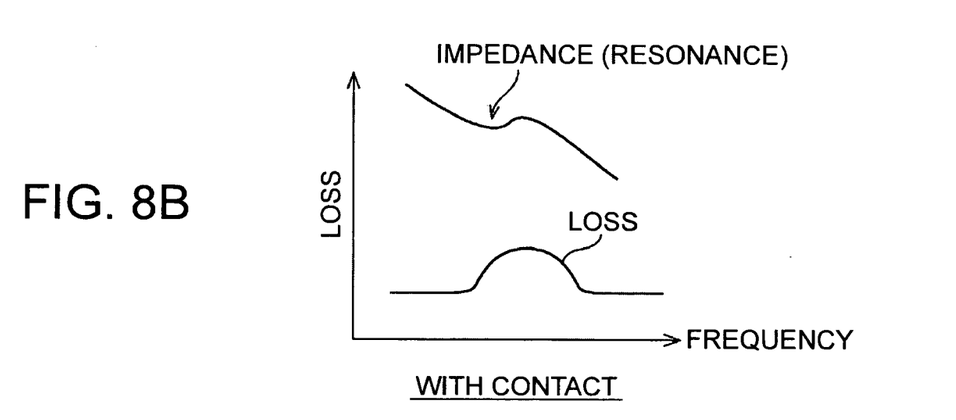

FIGS. 8A and 8B show examples of the extent of loss with or without the contact of the contact body on the contact surface.

Figure 8C:
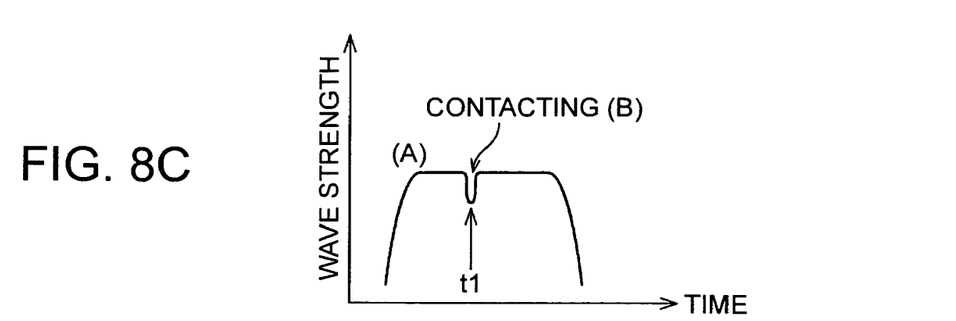

FIG. 8A shows the case where the contact body is not touching the contact surface. In this case, the loss is smaller than the one shown in FIG. 8B where the contact body is touching the contact surface. FIG. 8C shows the variation of wave strength with respect to time. When the contact body is touching the contact surface, the wave strength decreases at a time scale t1.

Figure 9:
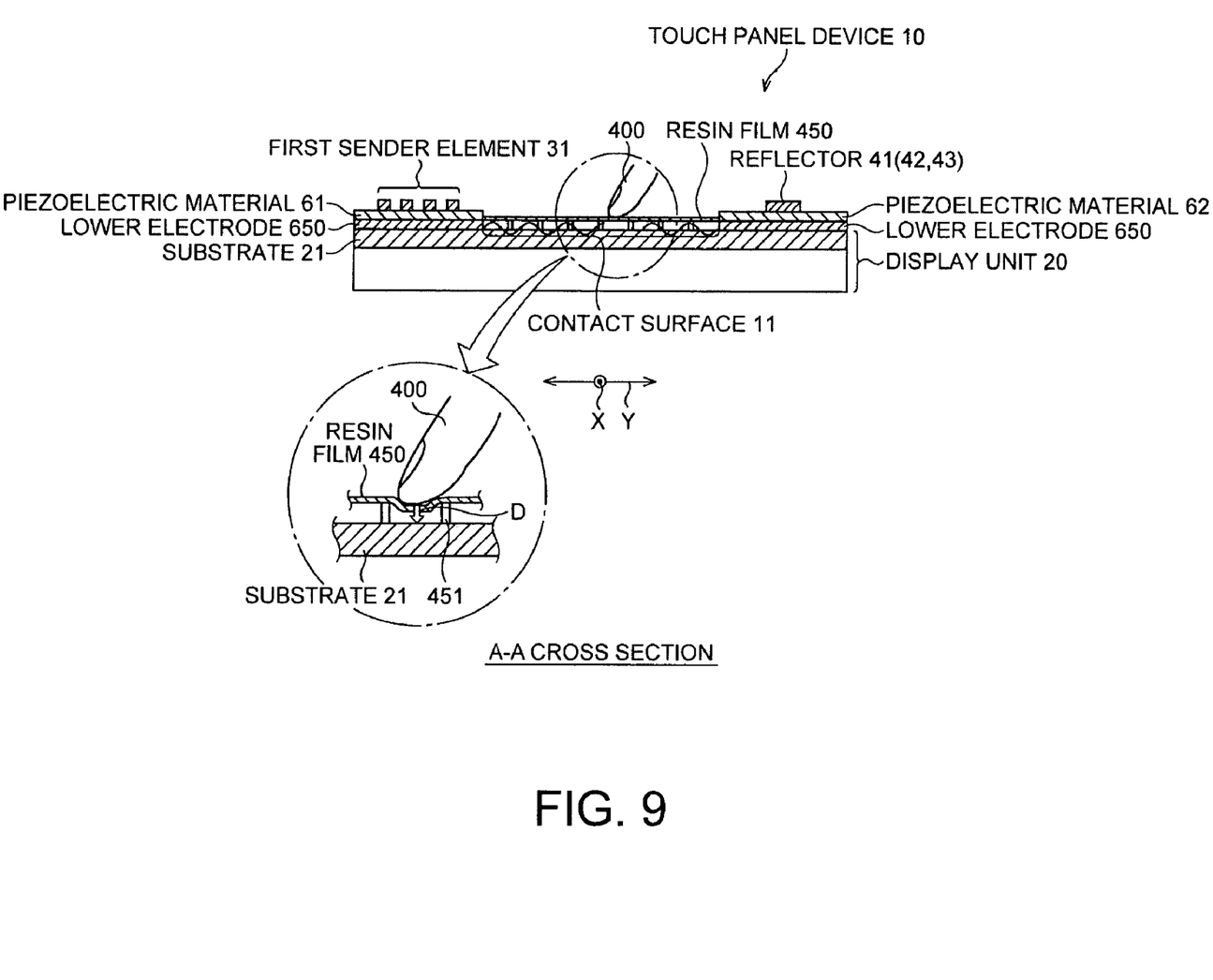
FIG. 9 is a diagram showing a cross section taken along the line A-A of a touch panel device according to a second embodiment of the invention.

FIG. 9 shows a second embodiment of the invention.

In the second embodiment shown in FIG. 9, in addition to the same configuration as the embodiment shown in FIGS. 1 to 3, a resin film 450 is provided over the contact surface 11 of the substrate 21. The resin film 450 is, for example, a transparent polyester film, etc. The resin film 450, which is provided over the contact surface 11, is kept off from the contact surface 11 with a supporting member 451 in between. Due to the above configuration, when the contact body 400 such as a finger or a stylus touches the resin film 450, the resin film 450 is depressed in the D-direction to touch the contact surface 11. Therefore, the sense of clicking can be derived using the contact body 400. Further, the resin film 450 covering the contact surface 11 prevents the contact surface 11 from being damaged. Even if the contact surface 11 is damaged with scars, etc., which affect the transmission of the surface acoustic waves 200 and 201, the fear of incorrect detection of the contact body position can be prevented.

The touch panel device 10 has a lower electrode 650. The lower electrode 650 is provided between: the piezoelectric materials 61 and 62; and the substrate 21.

Figure 10:
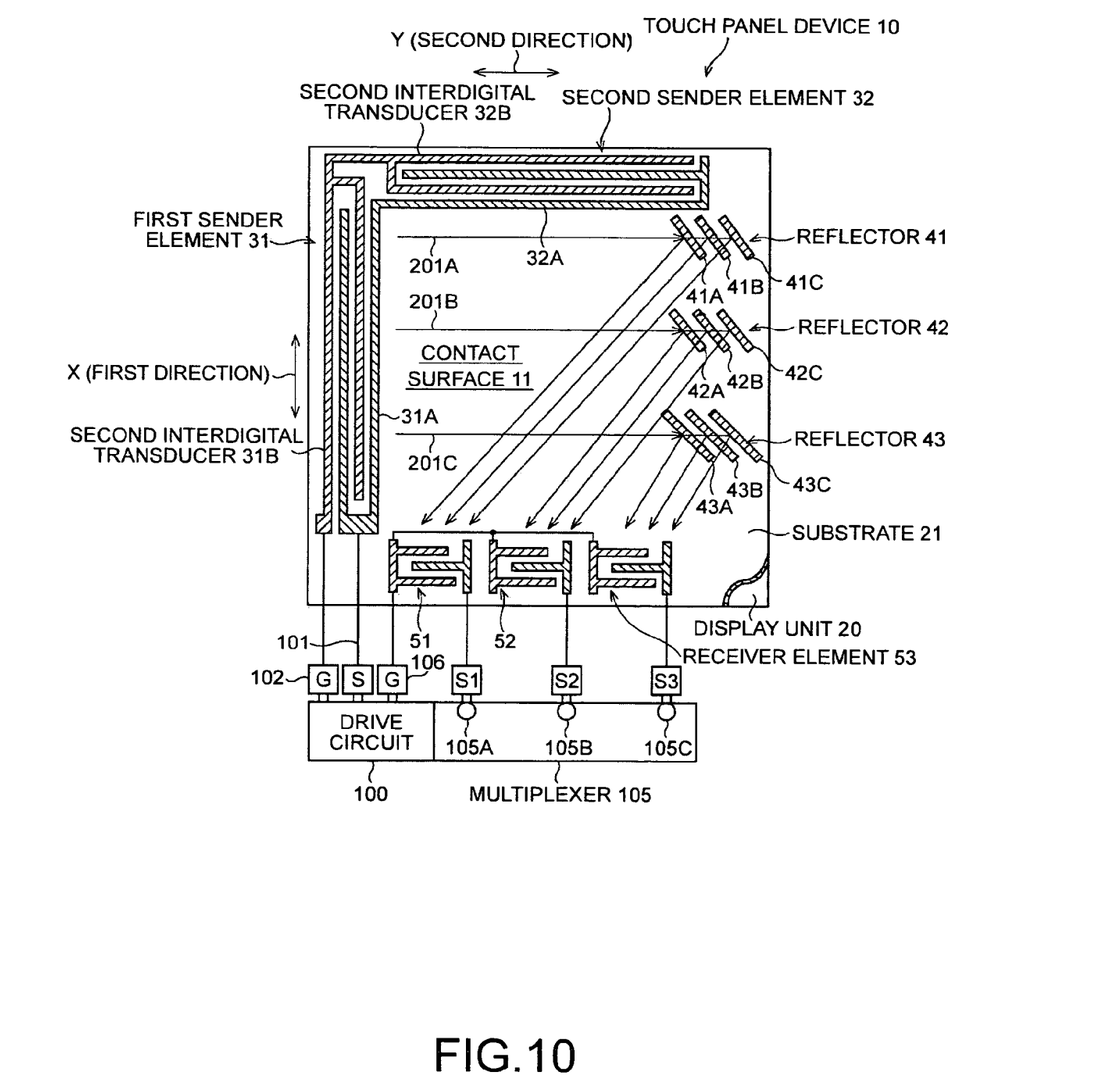
FIG. 10 is a plan view showing a third embodiment of the invention.

FIG. 10 shows a third embodiment of the invention. What is different between the third embodiment in FIG. 10 and the first embodiment in FIG. 1 is the configuration of the reflectors 41, 42 and 43. The other components of the third embodiment in FIG. 10, which are the same as those of the first embodiment in FIG. 1, will be described using the descriptions for the corresponding components of the first embodiment.

Each of the reflectors 41 to 43 shown in FIG. 10 has, for example, three reflecting units. That is, the reflector 41 has three reflecting units 41A to 41C. The reflector 42 has other three reflecting units 42A to 42C. The reflector 43 has yet other three reflecting units 43A to 43C.

As described above, by providing a plurality of reflecting units in each of the reflectors 41 to 43, an advantage arises that each of the surface acoustic waves 201A to 201C that are excited from the first sender element 31 can be reflected on each of the reflectors 41 to 43 at a high reflectance to be received by each of the receiver elements 51 to 53 at a high signal strength.

In the embodiments of the invention, only a single pair of receiver elements is required. Further, the receiver elements can directly receive the surface acoustic wave from the second sender element. In addition, the reflector reflects the surface acoustic wave from the first sender element and transmits the surface acoustic wave to be received by the receiver element. Thus, the electric wiring can be simplified while reducing the number of receiver elements and, with a less number of receiver elements on a substrate, the configuration of a touch panel can be simplified, leading to cost reduction due to the simplicity in mounting electric wire. The plurality of reflectors can reflect the surface acoustic wave from the first sender element and transmit the surface acoustic wave to be received by the receiver element.

The invention is not limited to the above embodiments. For example, the number of reflectors, the angle of the reflector, and the number of receiver elements can be varied accordingly. It is preferable that the number of reflectors and the number of receiver elements are the same. The more the numbers grow, the higher the accuracy becomes in detecting the contact position of a contact body on a contact surface.

For example, the display unit 20 shown in FIG. 2 is not limited to a liquid crystal display device and can be substituted by other flat panel display devices such as: field emission displays (FEDs) including surface-conduction electron-emitter displays (SEDs); and plasma displays, of course.

In the embodiments of the invention, the substrate 21 can also be called a base material. The substrate 21 is not limited to be part of a display unit, as shown in the embodiments. A component other than a display unit can be provided under the substrate 21.

The invention is not limited to the above embodiments and can be modified variously without departing from what is claimed.

Each of the configurations according to the embodiments can be partially omitted or arbitrarily combined to form different configurations.

What is claimed is:

1. A touch panel device, comprising:
a substrate;
a first sender element for sending a first surface acoustic wave, which is placed along a first direction on the substrate;
a second sender element for sending a second surface acoustic wave, which is placed along a second direction, orthogonal to the first direction, on the substrate;
a receiver element for directly receiving the second surface acoustic wave from the second sender element, which is placed along the second direction on the substrate to face the transmission side of the second sender element with an interval in between; and
a reflector, which is placed on the substrate, for achieving the receiver element's reception of the first surface acoustic wave from the first sender element by reflecting the first surface acoustic wave from the first sender element,
wherein a position of a contact body touching on a contact surface is detected by transmitting the first and second surface acoustic waves that are sent from the first and second sender elements through the contact surface and receiving the first and second surface acoustic waves on the receiver element.

2. The touch panel device according to claim 1, wherein a plurality of the reflectors are placed along the first direction on the substrate while facing the first sender element with an interval in between.

3. The touch panel device according to claim 1, wherein a plurality of the receiver elements are placed along the second direction.

4. The touch panel device according to claim 3, wherein each of the reflectors has an individual set angle for achieving the corresponding receiver element's reception of the surface acoustic wave from the first sender element.

5. The touch panel device according to claim 4, wherein each of the reflectors has a plurality of reflecting units and the plurality of reflecting units are placed in parallel at intervals along the second direction.

* * * * *